(Model.)
C. R. HEIZMANN.
APPLE PARER, CORER, SLICER, AND QUARTERER.
No. 255,856. Patented Apr. 4, 1882.
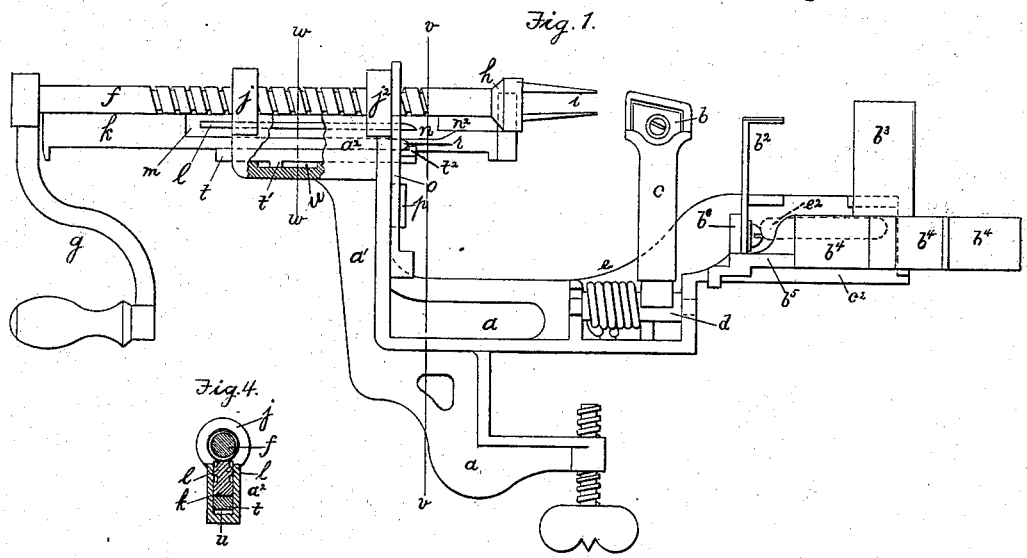
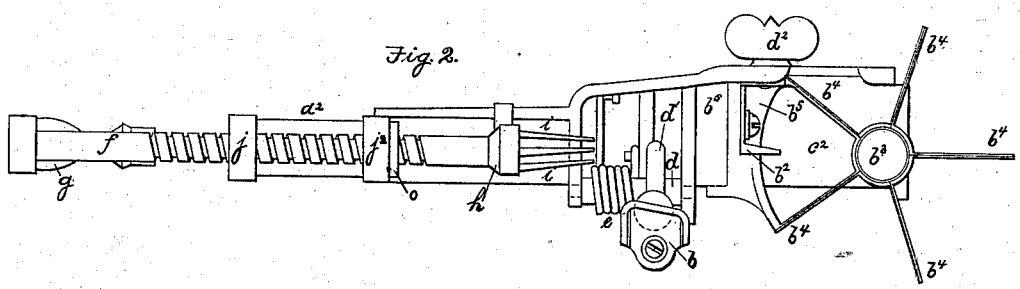
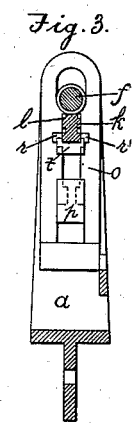
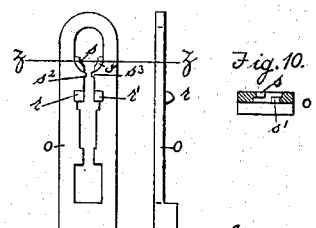
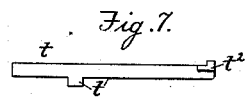
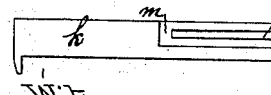
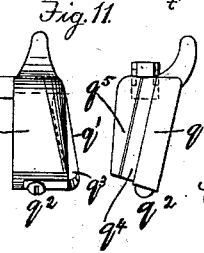
Witnesses:
Inventor:
C. Raymond Heizmann

UNITED STATES PATENT OFFICE.

C. RAYMOND HEIZMANN, OF READING, PENNSYLVANIA, ASSIGNOR TO THE PENN HARDWARE COMPANY, OF SAME PLACE.

APPLE PARER, CORER, SLICER, AND QUARTERER.

SPECIFICATION forming part of Letters Patent No. 255,856, dated April 4, 1882.

Application filed December 23, 1881. (Model.)

*To all whom it may concern:*

Be it known that I, C. RAYMOND HEIZMANN, of Reading, Pennsylvania, have invented a new and useful Improvement in Machines for Paring, Coring, and Slicing or Dividing Apples, of which improvement the following is a specification.

The machine herein described belongs to the class of apple-parers in which the apple-bearing shaft is susceptible of certain free longitudinal movements through its bearings toward and from the paring-knife without rotation, as well as the advancing and receding movements regulated by its screw-thread.

My object is to make a substantial machine which shall be at once simple in form, positive in action, and inexpensive in construction.

I will now proceed to state the nature of my invention, referring to the annexed drawings, in which—

Figure 1 is a side elevation of the machine, a small portion of the upper part of the frame being broken away to expose the recess $u$, traversed by the lug $t'$ of the supporting-bar $t$; Fig. 2, a plan of the machine; Fig. 3, a sectional elevation of the same on the line $v\ v$ of Fig. 1; Fig. 4, a sectional elevation on the line $w\ w$ of Fig. 1. The other views represent details, Fig. 5 being a side elevation of the track-bar $k$, and Fig. 6 a sectional elevation of the same on the line $x\ x$ of Fig. 5; Fig. 7, a side elevation of the supporting-bar $t$, and Fig. 8 a front end elevation of the same; Fig. 9, front and side elevations of the engaging-bolt $o$, and Fig. 10 a section of the same on the line $z\ z$ of Fig. 9; Fig. 11, side and front elevations of the track-bar $k$, with a supplementary paring-knife rigidly attached to its front end.

$a\ a'\ a^2$ is the frame, the top part, $a^2$, of which is hollow or chambered, as indicated in Figs. 1 and 4.

$b$ is the paring-knife, which is adjustably secured, as by a screw, to the ordinary upright trough-shaped standard, $c$, which has a rotary vibration on a vertical shaft, (not shown,) by which it is attached to the cross arm or stop $d'$ of the horizontal shaft $d$, the latter being surrounded and controlled by a spiral spring, $e$, all constructed and arranged in a well-known form and manner.

$f$ is the apple-bearing shaft, which is screw-threaded, as shown, and has the crank $g$ at its rear end and the fork consisting of the head $h$ and tines $i$ in one piece screwed or riveted to the front end of said shaft $f$. The shaft $f$ passes through the smooth-bored upright projections $j$ and $j^2$ of the frame.

$k$, Figs. 1 and 5, is a bar which extends through the chamber in the upper part, $a^2$, of the frame. The forward end of this bar is curved in a plane at right angles to its length, as shown at $k'$ in Figs. 5 and 6. A track, $l$, is formed in relief on each side of bar $k$ by cutting away a part of the thickness of the bar, forming notches or depressions $m$ and $n$ at either end of said tracks. The tracks $l$ are beveled at their front ends, as shown in Figs. 1 and 5. The rear end of the track-bar $k$ comes in contact with the crank $g$.

$o$, Figs. 1, 2, 3, 9, and 10, is a bolt cored out from top to bottom, as shown in Fig. 9. It is loosely held in an upright position against the flat face of the upright part $a'$ of the frame by means of an ordinary undercut stud, $p$, which projects from the face of the frame, and permits said bolt $o$ to slide freely up and down thereon. The lugs $r$ and $r'$ project from the broad front face of the bolt $o$, as shown in Figs. 1, 3, and 9. The bolt $o$ is provided with projections $s$ and $s'$, Fig. 9, which are short segments of screw-threads that in the operation of the machine are caused to engage the thread of the shaft $f$.

$t$, Figs. 1, 3, 4, 7, and 8, is a bar located underneath the track-bar $k$. It slides through the chamber in the head $a^2$ of the frame. It has a lug, $t'$, which is brought into contact with the front and rear walls of the recess $u$ of said chamber, (see Fig. 1,) and thus limits the movements of the said bar $t$. The bar $t$ has at its fore end the lugs $t^2$, which are brought into contact with the under and rear surfaces of the lugs $r$ and $r'$ of bolt $o$, and serve to hold said bolt $o$ up and keep said bar $t$ from moving forward prematurely at certain periods in the operation of the machine, as below described.

$b^2$, Fig. 1, is an ordinary coring and slicing knife, by which the apples are sliced crosswise. Another device (shown in Figs. 1 and 2) consists of the tube $b^3$ for coring the apples and the radial blades $b^4$ for dividing them lengthwise. The web $b^5$, cast or otherwise formed integral with the radial arms $b^4$, serves as a base to an upright arm, $b^6$, upon which the coring and slicing knife $b^2$ is adjustably attached, the whole forming one reversible piece, which is capable of adjustment, as desired, to slice the apples crosswise or divide them lengthwise, and which, after adjustment, is held in position on the platform-extension $c^2$ of the frame by the thumb-screw $d^2$, which works through the slot $e^2$ in the side flange of the platform.

$q$, Fig. 11, is the base of the supplementary detachable paring-knife $q'$. $q^2$ is a screw for securing the knife to the base $q$. $q^3$ is a clear opening underneath the knife for the exit of the parings. $q^4$ is a space between the knife $q'$ and the guard $q^5$. This knife is intended to be used for paring the rear portion of the apple. After an apple has been put on the fork-tines $i$, and before the apple-bearing shaft $f$ has been moved forward, the shaft $f$ is rotated, and the rear part of the apple is thus brought in cutting contact with the edge of the knife $q'$. The machine being operated without the supplementary paring-knife, this knife, with its appendages, may be used or dispensed with.

In Fig. 1 the bolt $o$ is shown to be up, the segments $s$ and $s'$ being in engagement with the thread of the shaft $f$. When the bolt $o$ is down, or, in other words, when the segments $s$ and $s'$ are disengaged from the thread of the shaft $f$, the said bolt $o$ simply bears on the peripheral surface of this shaft, which can then be moved back and forth freely through its bearings $j$ and $j^2$ without rotation of the shaft.

At the completion of an operation on an apple the shaft $f$ is drawn back, the fork-head $h$, soon after the backward motion of the fork-shaft has commenced, striking the shoulder $n^3$, Fig. 5, of the track-bar $k$, and thus carrying back with it said bar, and this recession of the shaft continues until the fork-head $h$ comes against the bolt $o$, the shoulder $n^3$ of the track-bar $k$ being then flush with the face of the bolt $o$, and if an apple be then stuck on the fork this act presses back the track-bar $k$ and the supporting-bar $t$, causing the projections $s^2$ and $s^3$ to slide up the inclines $n^2$ of bar $k$, bringing the said projections $s^2$ and $s^3$ about on a level with the top of the track $l$ and also bringing the lugs $t^2$ of bar $t$ under and behind the lugs $r$ and $r'$ of the bolt $o$. The projections $s^2$ and $s^3$ (see Fig. 9) of bolt $o$ are now ready to mount the tracks $l$, and thus bring the screw-segments $s$ and $s'$ into position for engaging the screw-thread of shaft $f$ when this shaft is pushed forward. The shaft $f$, carrying the apple, can now be pushed forward toward the paring-knife without rotation until the thread of this shaft engages the segments $s$ and $s'$, from which period until the end of its forward movement the shaft $f$ is advanced by turning the crank $g$.

The lugs $t^2$ project upward, and also sidewise, and are employed for two purposes—viz., first, for supporting the bolt $o$ in the position to which it has been raised by the sliding of projections $s^2$ and $s^3$ up the inclines $n^2$, and, second, for preventing the bar $t$ from being prematurely moved forward by friction of the track-bar $k$ thereon, the said bar $t$ not being intended to be moved forward until the projections $s^2$ and $s^3$ have mounted the tracks $l$ and raised up bolt $o$ sufficiently to free the lugs $t^2$, and thus allow the supporting-bar $t$ to be pushed forward. The lugs $t^2$, by being brought under the projections $r$ and $r'$, are caused to hold the bolt $o$ up, and the contact of these lugs $t^2$ with the rear of the said projections $r$ and $r'$ prevents the premature forward movement of the bar $t$.

It will be seen that the track-bar $k$ is pressed forward by the crank, and that when the fork-head $h$ has passed the paring-knife $b$ the projections $s^2$ and $s^3$ have reached the notches $m$, allowing the bolt $o$ to drop, and thus breaking the engagement between the segments $s$ and $s'$ and the shaft-thread. The withdrawal of the shaft $f$ and the other above-described operations can then be repeated, and so on indefinitely.

The drawings show the slicing and coring knife $b^2$ in position for use. In such case the coring-tube $b^3$ and radial cutters $b^4$ rest on the platform $c^2$, as shown in Fig. 1. When it is desired to bring the coring-tube $b^3$ and radial cutters $b^4$ into use the thumb-screw $d^2$ is loosened, and the combined device is adjusted so as to bring the coring-tube into horizontal position. In this case the slicing-knife $b^2$ lies down on the platform $c^2$.

Instead of employing two tracks, $l$, one on each face of bar $k$, as above described, and the two corresponding projections $s^2$ and $s^3$, the two lugs $r$ and $r'$ and the two screw segments $s$ and $s'$, but one of such tracks $l$ may be used, and in such case only the corresponding one of the two projections $s^2$ and $s^3$ and of lugs $r$ and $r'$ and of segments $s$ and $s'$ are required. I prefer, however, the form of construction first described, because it secures more freedom of action in the engaging-bolt $o$.

It will be seen that the track-bar $k$ is employed as the medium for effecting engagement and disengagement between the thread of the apple-bearing shaft and the counter screw-threads or segments at certain periods in the longitudinal movements of said shaft. This track-bar is shown to be located underneath the apple-bearing shaft. It may, however, be located above or on either side of said shaft, the necessary changes being made in the tracks and in the form of that part of the frame through which said bar passes.

A track-bar located as above described can, with obvious modifications, be employed to advantage in paring-machines which employ a rack, nut, trigger, or equivalent device for carrying screw-threads or segments of screw-threads intended to gear with the thread of the apple-bearing shaft for the purpose of throwing such screw-threads or segments into or out of engagement with the shaft-threads.

I claim—

1. In an apple-parer, the combination of the fork-shaft $f$, the crank $g$, the track-bar $k$, having a track, $l$, the supporting-bar $t$, and the engaging-bolt $o$, for the purpose of effecting engagement between the said bolt $o$ and the said shaft $f$, substantially as set forth.

2. The combination of the fork-shaft $f$, crank $g$, the track-bar $k$, having a track, $l$, and the engaging-bolt $o$, for the purpose of effecting disengagement between said bolt $o$ and said shaft $f$, substantially as set forth.

3. The combination of the corer and slicer $b^2$ with the corer and dividers $b^3$ $b^4$, forming one reversible piece adjustably attached to the frame, whereby the machine is adapted at will for slicing apples crosswise or dividing them lengthwise while coring them, all substantially as set forth.

4. In an apple-parer, the apple-bearing shaft, its crank and fork-head, and a track-bar located as above described, in combination with a rack, nut, trigger, or equivalent device, carrying a screw-thread or segment for the purpose of throwing such screw-thread or segment into or out of engagement with the screw-thread of said apple-bearing shaft, substantially as set forth.

5. In an apple-parer, the combination of the shaft $f$, its fork, the crank $g$, track-bar $k$, base $q$, and supplementary paring-knife $q'$ for paring the rear portion of an apple, substantially as set forth.

C. RAYMOND HEIZMANN.

Witnesses:
 J. E. SHAW,
 JOHN A. WIEDERSHEIM.